United States Patent
Huang et al.

(10) Patent No.: US 7,793,295 B2
(45) Date of Patent: Sep. 7, 2010

(54) SETTING BANDWIDTH LIMITER AND ADJUSTING EXECUTION CYCLE OF SECOND DEVICE USING ONE OF THE GBL CLASSES SELECTED BASED ON PRIORITY OF TASK FROM FIRST DEVICE

(75) Inventors: Jhih-Cyuan Huang, Taipei (TW); Huey-Tyug Chua, Hsin-Chu Hsien (TW); Yann-Chang Lin, Hsin-Chu (TW)

(73) Assignee: Mediatek Incoropration, Hsin-Chu (TW)

( * ) Notice: Subject to any disclaimer, the term of this patent is extended or adjusted under 35 U.S.C. 154(b) by 1652 days.

(21) Appl. No.: 11/024,166

(22) Filed: Dec. 28, 2004

(65) Prior Publication Data
US 2006/0048150 A1  Mar. 2, 2006

(51) Int. Cl.
*G06F 9/46* (2006.01)
*G06F 13/28* (2006.01)

(52) U.S. Cl. .......................... 718/103; 710/23; 710/24; 710/244

(58) Field of Classification Search ............. 710/22–23, 710/244; 718/103
See application file for complete search history.

(56) References Cited

U.S. PATENT DOCUMENTS

| | | | |
|---|---|---|---|
| 5,016,165 A * | 5/1991 | Tanikawa et al. ............... | 710/22 |
| 5,121,390 A * | 6/1992 | Farrell et al. ................. | 370/458 |
| 6,119,188 A * | 9/2000 | Sheafor et al. ............... | 710/107 |
| 6,564,329 B1 * | 5/2003 | Cheung et al. ............... | 713/322 |
| 7,177,317 B2 * | 2/2007 | Bonomi et al. ............... | 370/412 |
| 2003/0088722 A1 * | 5/2003 | Price .......................... | 710/244 |
| 2003/0099200 A1 * | 5/2003 | Kiremidjian et al. ..... | 370/230.1 |

FOREIGN PATENT DOCUMENTS

EP          0275157 A2      7/1998

OTHER PUBLICATIONS

German Office Action mailed Nov. 2, 2006.

* cited by examiner

*Primary Examiner*—Meng-Ai An
*Assistant Examiner*—Jennifer N To
(74) *Attorney, Agent, or Firm*—Thomas, Kayden, Horstemeyer & Risley (57) ABSTRACT

Task management methods. A plurality of GBL (global bandwidth limiter) classes is provided. One of the GBL classes is selected based on the priority of a first task, in which the first task is from a MCU (micro-controller unit) bus. A system GBL class is selected based on the highest GBL class which has been selected among the GBL classes. A bandwidth limiter of a DMA (direct memory access) unit is assigned according to the system GBL class and the priority of a second task if the DMA unit is activated by the second task. The second task is from a DMA bus, and the cycle between the DMA and MCU buses is determined according to the bandwidth limiter.

41 Claims, 10 Drawing Sheets

| GBL Class | VALUE |
|---|---|
| 0 | 0 |
| 1 | 10 |
| 2 | 50 |
| 3 | 100 |
| 4 | 200 |

| Task Priority | Bandwidth Limiter |
|---|---|
| 0~9 | (1×Value of GBL_Class)/8 |
| 10~39 | (2×Value of GBL_Class)/8 |
| 40~89 | (3×Value of GBL_Class)/8 |
| 90~119 | (4×Value of GBL_Class)/8 |
| 120~169 | (5×Value of GBL_Class)/8 |
| 170~199 | (6×Value of GBL_Class)/8 |
| 200~249 | (7×Value of GBL_Class)/8 |
| 250~255 | (8×Value of GBL_Class)/8 |

SETTING BANDWIDTH LIMITER AND ADJUSTING EXECUTION CYCLE OF SECOND DEVICE USING ONE OF THE GBL CLASSES SELECTED BASED ON PRIORITY OF TASK FROM FIRST DEVICE

BACKGROUND

The present disclosure relates generally to task management, and more particularly, to methods that manage and preserve task priority on real-time systems, and related devices.

Most resources of a real-time system are limited. Generally, to effectively utilize the system resource, a task having higher priority is able to interrupt the execution of a task having lower priority.

However, the so-called task priority inverse might disorder the task priorities. It can be found on platforms, which embed DMA (Direct Memory Access) to off-load a CPU (Central Processing Unit). For example, the activation of DMA will disorder the task priorities due to resource sharing with the CPU on an EMI (External Memory Interface) arbitrator. The inconsistencies between DMA usage and priority distribution therefore will reduce the system execution efficiency.

Figure 1:
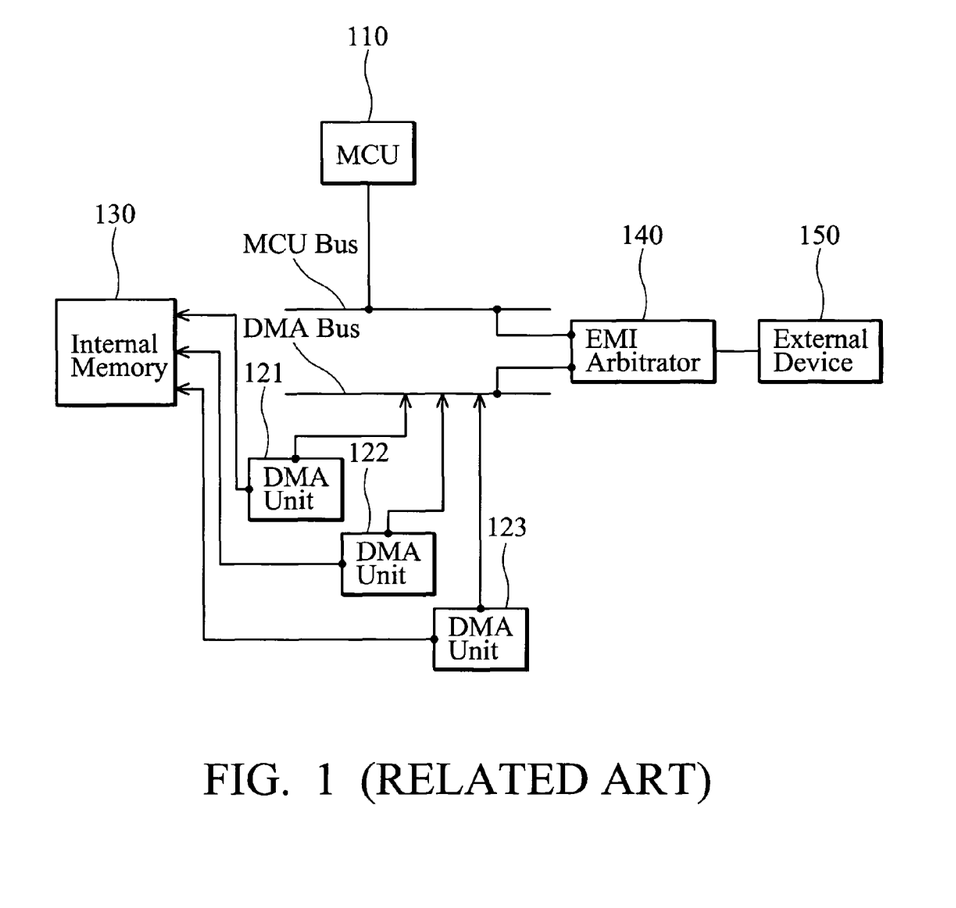
FIG. 1 is a schematic diagram illustrating the hardware architecture of an embedded system with DMA.

FIG. 1 is a schematic diagram illustrating the hardware architecture of an embedded system with DMA. As shown in FIG. 1, a MCU (Micro-Controller Unit) 110 can issue bus requests to an EMI arbitrator 140 for accessing an external device 150 via a MCU bus. Additionally, DMA units (121, 122, and 123) can access an internal memory 130, and just like the MCU 110, can issue bus requests to the EMI arbitrator 140 for accessing the external device 150 via a DMA bus. When a simultaneous access occurs, that is, multiple requests are received from the MCU and DMA buses, the EMI arbitrator 150 schedules the order of requests equally by round robin. In other words, the EMI arbitrator 150 executes those requests one by one from the MCU and DMA buses by turns. Therefore, in real-time systems, tasks having a higher priority, such as requests from the MCU bus, cannot fully occupy the EMI resource to complete execution as soon as possible. Conventionally, requests from the DMA bus will share the bandwidth, causing system resources to be shared among tasks having higher and lower priorities. This task priority inverse problem violates the basic concept of real-time systems. Due to the task priority inverse problem, the system execution efficiency will therefore be reduced.

SUMMARY

Task management methods, and related devices, are provided. In an exemplary embodiment of a task management method, a plurality of GBL (global bandwidth limiter) classes is provided. One of the GBL classes is selected based on the priority of a first task, in which the first task is from a MCU (micro-controller unit) bus. A system GBL class is selected based on the highest GBL class which has been selected among the GBL classes. A bandwidth limiter of a DMA (direct memory access) unit is assigned according to the system GBL class and the priority of a second task if the DMA unit is activated by the second task. The second task is from a DMA bus, and the cycle between the DMA and MCU buses is determined according to the bandwidth limiter.

In an exemplary embodiment of a task management method, a plurality of GBL (global bandwidth limiter) classes is provided. One of the GBL classes is selected based on the priority of a first task, in which the first task is from a MCU (micro-controller unit) bus. A system GBL class is selected based on the highest GBL class which has been selected among the GBL classes. A bandwidth limiter of a DMA (direct memory access) unit is assigned according to the system GBL class. The cycle between the DMA and MCU buses is determined according to the bandwidth limiter.

Task management methods may take the form of program code embodied in a tangible media. When the program code is loaded into and executed by a machine, the machine becomes an apparatus for practicing the disclosed method.

DESCRIPTION OF THE DRAWINGS

Task management methods and related devices will become more fully understood by referring to the following detailed description with reference to the accompanying drawings, wherein.

DESCRIPTION

Figure 2:
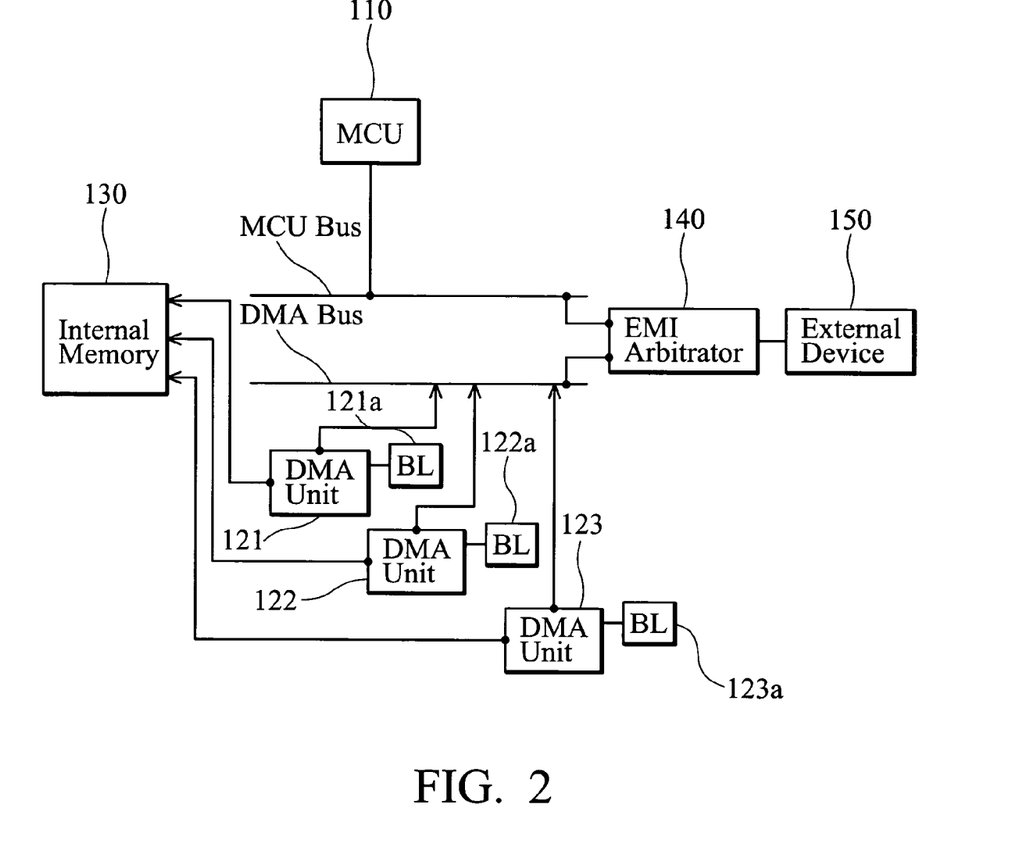
FIG. 2 is a schematic diagram illustrating the hardware architecture of an embodiment of a device providing a task management method.

Task management methods and related devices are provided. FIG. 2 is a schematic diagram illustrating the hardware architecture of an embodiment of a device providing a task management method. Similar components in FIG. 1 and FIG. 2 are referred to with the same labels. Generally, a MCU can fully occupy the system resource controlled by an EMI arbitrator only if other DMA unit is idle. And, a DMA unit can fully occupy the system resource controlled by the EMI arbitrator only if the MCU is idle. If the DMA unit is active while MCU is running a critical task, the critical task is limited to preserve its task priority. In other words, if the MCU runs a timing critical task, the DMA bandwidth or executing cycle on the EMI arbitrator is limited to preserve the task priority. Here, each DMA unit may associate a bandwidth limiter (BL 121a, 122a, and 123a) via software or be implemented as a hardware register, and the bandwidth or the executing cycle is adjusted according to the relative priority of tasks at run time.

In some embodiments, the DMA bandwidth limiter (BL 121a, 122a, and 123a) may have a value expressed in 8-bits, and range from 0 to 255. If the value of the DMA bandwidth limiter is 0, meaning that the bandwidth (the executing cycle) is unlimited to DMA unit, the DMA unit can fully occupy the system resource controlled by the EMI arbitrator 140 if the MCU 110 is idle. That is, the traditional round-robin scheduling will be applied. If the value of the DMA bandwidth limiter is 1, one DMA bus cycle can be granted only after (4×1)=4 MCU bus cycles. If the value of the DMA bandwidth limiter is 2, one DMA bus cycle can be granted only after (4×2)=8 MCU bus cycles. Similarly, the maximum limitation is 4×255=1020, one DMA bus cycle can be granted only after 1020 MCU bus cycles. Task priority may also be expressed in 8-bits, ranging from 0 to 255, from the highest to the lowest priority. Therefore, the higher the value is, the longer the DMA bus cycle would be. However, person skilled in the art should understand that the way to set up the value of the DMA bandwidth limiter is not a limitation of this invention. Any other ways to manage the value should be covered in this invention.

Figure 3:
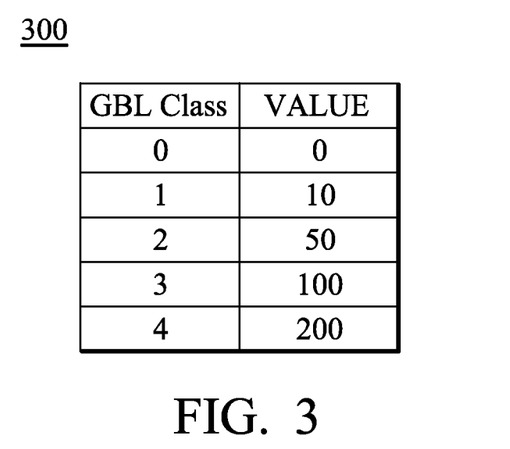
FIG. 3 shows an embodiment of GBL classes.
Figure 4:
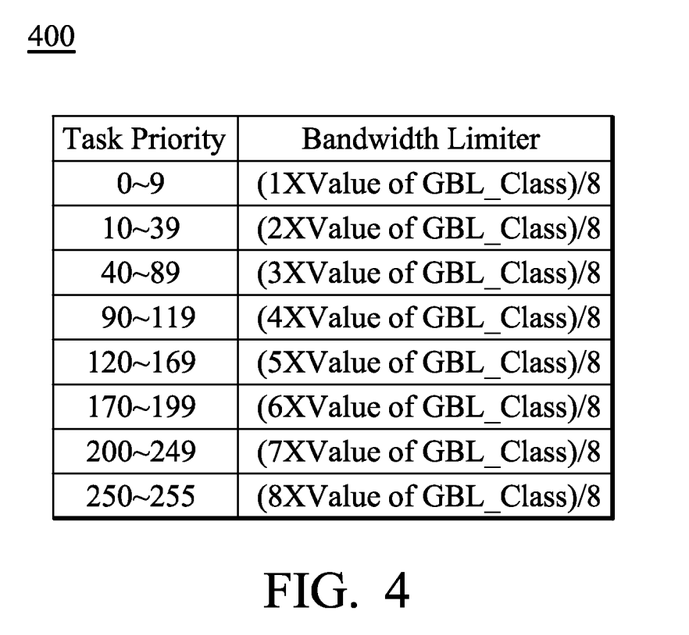
FIG. 4 shows an embodiment of the relationship of task priority and bandwidth limiter.

In some embodiment, GBL classes are also defined. The GBL classes can be classified according to the DMA bandwidth limiter. A table 300 of the GBL classes is shown in FIG. 3. In table 300, the corresponding value of GBL class 0 is 0, representing no limitation is applied to the DMA bandwidth limiter. The corresponding value of GBL class 1 is 10, representing that the available DMA bandwidth limiter is from 1 to 10. The corresponding value of GBL class 2 is 50, representing that the available DMA bandwidth limiter is from 11 to 50. The corresponding value of GBL class 3 is 100, representing that the available DMA bandwidth limiter is from 51 to 100. The corresponding value of GBL class 4 is 200, representing that the available DMA bandwidth limiter is from 101 to 200. The mapping rule between bandwidth limiter and task priority is established. A table 400 of the mapping rules is shown in FIG. 4. In table 400, the bandwidth limiter for task priority from 1 to 9 is (1×GBL_class)/8, the bandwidth limiter for task priority from 10 to 39 is (2×GBL_class)/8, the bandwidth limiter for task priority from 40 to 89 is (3×GBL_class)/8, the bandwidth limiter for task priority from 90 to 119 is (4×GBL_class)/8, the bandwidth limiter for task priority from 120 to 169 is (5×GBL_class)/8, the bandwidth limiter for task priority from 170 to 199 is (6×GBL_class)/8, the bandwidth limiter for task priority from 200 to 249 is (7×GBL_class)/8, and the bandwidth limiter for task priority from 250 to 255 is (8×GBL_class)/8.

Figure 5:
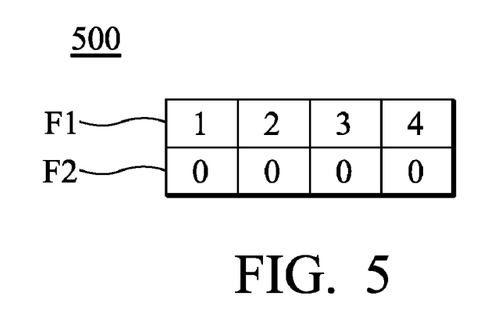
FIG. 5 shows an embodiment of a data structure for tracking the maximum GBL class.

Additionally, a data structure for tracking the maximal GBL class in the GBL classes is used, as shown in FIG. 5. The data structure is an array of integer counter mapping to each GBL class, namely GBL counting array 500. Every non-zero GBL class is associated with an entry. Field F1 records the respective GBL classes, and field F2 records a corresponding integer counter recording the times a GBL class has been selected. It is understood that the range of the DMA bandwidth limiter and task priority, the cycle unit, the classification of GBL classes, the mapping rule, and the data structure are examples of the embodiments, and not limited thereto.

The present invention provides an effective method and apparatus to manage available system resources, such as, for example, the external device 150 as shown in FIG. 2.

Figure 6:
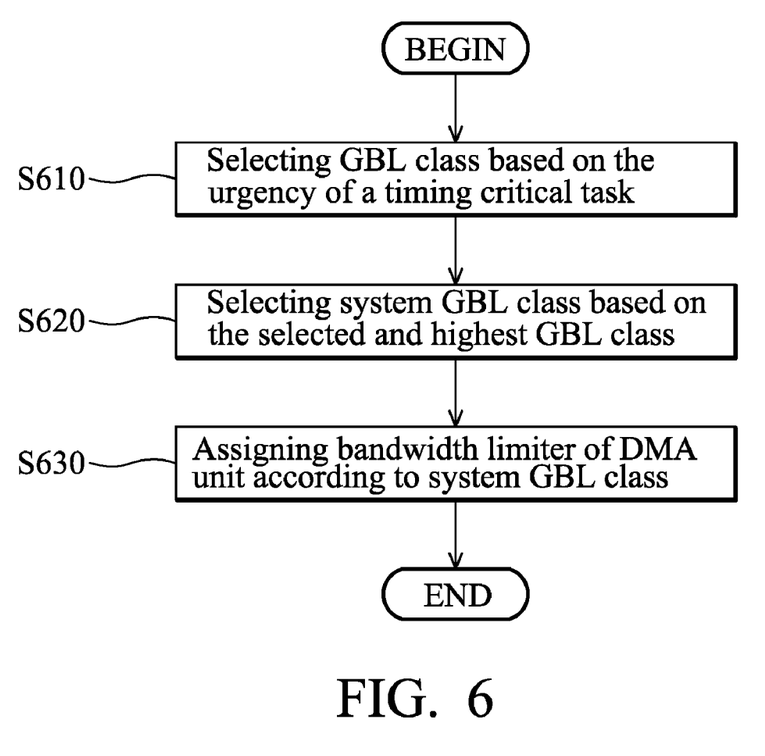
FIG. 6 is a flowchart showing an embodiment of a task management method.

FIG. 6 is a flowchart showing an embodiment of a task management method. If a timing critical task is issued from the MCU bus, in step S610, one of the GBL classes is selected based on the priority of the task. In some embodiments, it can be implemented by incrementing the integer counter corresponding to the GBL class whenever a GBL class is selected. In step S620, a system GBL class is determined based on the current highest GBL class which has been selected among the GBL classes. That is, if the selected GBL class corresponding to the task is the highest, it will become the system GBL class. Then, in step S630, the bandwidth limiters of all of the DMA units are assigned according to the system GBL class, based on, for example, the value corresponding to the GBL class in the table 300. Therefore, the cycle between the DMA and MCU buses is immediately determined according to the bandwidth limiter.

Figure 7:
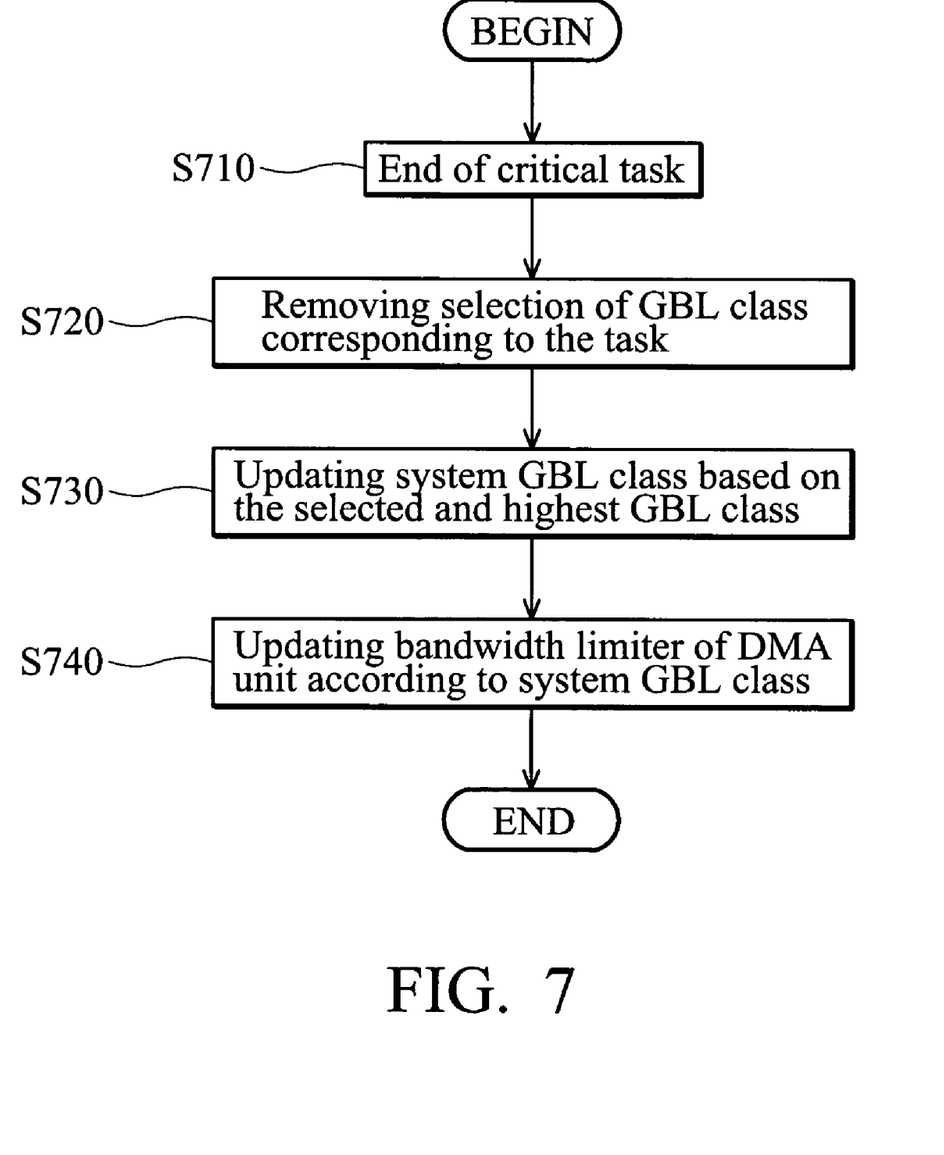
FIG. 7 is a flowchart showing an embodiment of a task management method.

FIG. 7 is a flowchart showing an embodiment of a task management method. At the end of a critical task, in step S710, the critical task should abandon the availability of current system GBL. Thus, to restore the GBL class, in step S720, a GBL class selection corresponding to the task is removed. In step S730, the system GBL class is updated based on the current highest GBL class that has been selected among the GBL classes. In step S740, the bandwidth limiters of all of the DMA units are updated according to the updated system GBL class, such that the cycle between the DMA and MCU buses is adjusted.

Figure 8:
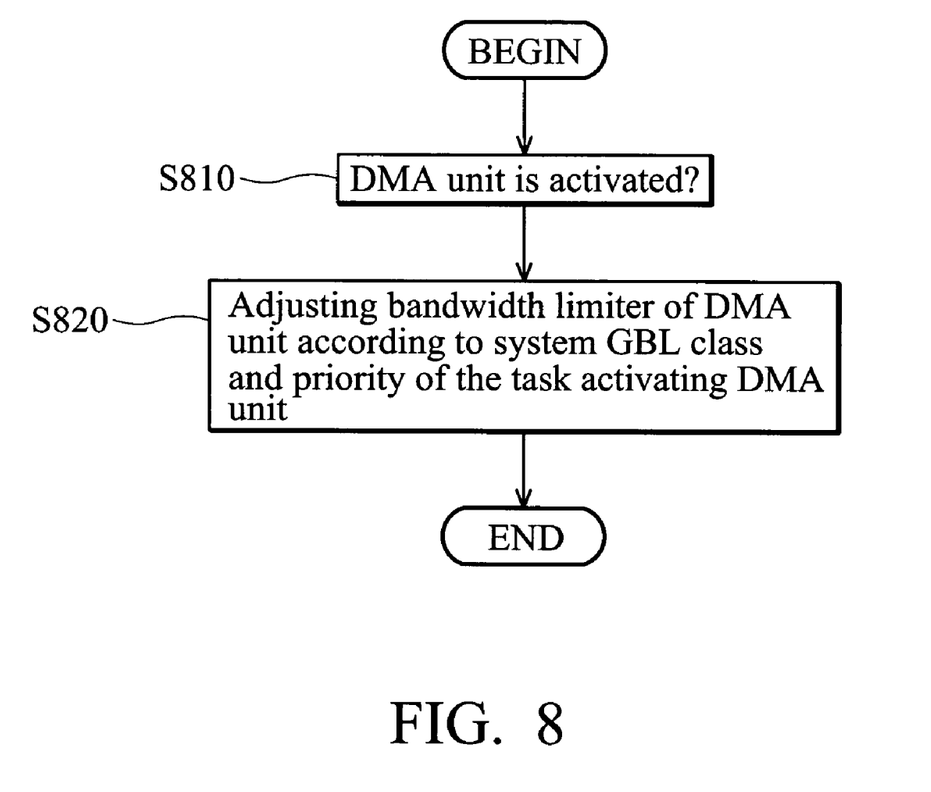
FIG. 8 is a flowchart showing an embodiment of a task management method.

FIG. 8 is a flowchart showing an embodiment of a task management method. In step S810, when a DMA is going to be activated by a task, in step S820, the bandwidth limiter of the DMA unit is adjusted according to the system GBL class and the priority of the task activating the DMA unit as shown in table 400.

Figure 11:
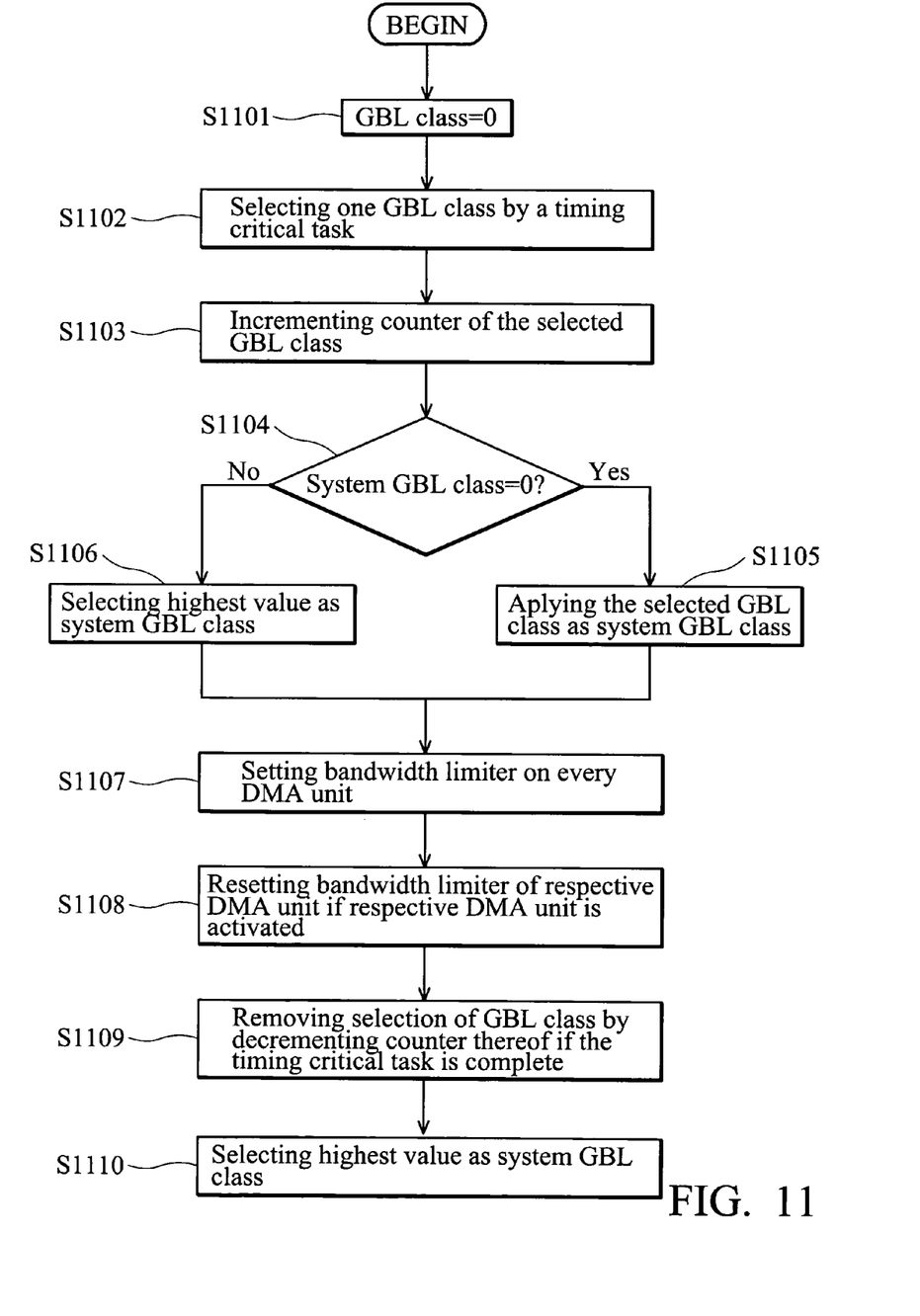
FIG. 11 shows an example of a task management method.

FIG. 11 shows an example of a task management method. First, in step S1101, the GBL class is initially set as "0". If a timing critical task is issued, in step S1102, one of the GBL classes is selected based on the priority of the task. It is understood that each GBL class contains a value for adjusting the executing cycle, in which the greater the value is, the longer the executing cycle is adjusted. In step S1103, the integer counter corresponding to the selected GBL class in the GBL counting array is incremented. It is also understood that the selected GBL class is recorded in a register. The register is a GBL counting array, in which the GBL counting array comprises a plurality of entries respectively corresponding to one of the GBL classes for recording the times of the GBL class has been selected. For example, the GBL classes include a GBL class 0, a GBL class 1, a GBL class 2, a GBL class 3 and a GBL class 4. The register is an array with four integer entries respectively corresponding to the GBL class 1, the GBL class 2, the GBL class 3 and the GBL class 4.

Then, in step S1104, it is determined whether the system GBL class is "0". If so, in step S1105, the selected GBL class is applied as the system GBL class. If not, in step S1106, the GBL counting array is checked for selecting the recorded GBL class corresponding to a value having the longest executing cycle as the system GBL class. Then, in step S1107, the bandwidth limiter of every DMA units are set according to the system GBL class to adjust the executing cycle of each DMA unit. Thereafter, if a respective DMA unit is activated by a task, in step S1108, the bandwidth limiter of the activated DMA unit is reset according to the priority of the task activating the DMA unit if the timing critical task is not complete. If the timing critical task is complete, in step S1109, the selection of the system GBL class is removed, and the GBL class corresponding to the timing critical task is removed by decrementing the counter of the GBL class correspondingly. Then, in step S1110, the recorded GBL class corresponding to a value having the longest executing cycle is re-selected as the system GBL class. It is understood that the bandwidth limiter of the activated DMA unit is therefore reset according to the priority of the task activating the DMA unit and the updated system GBL class.

Figure 9A:
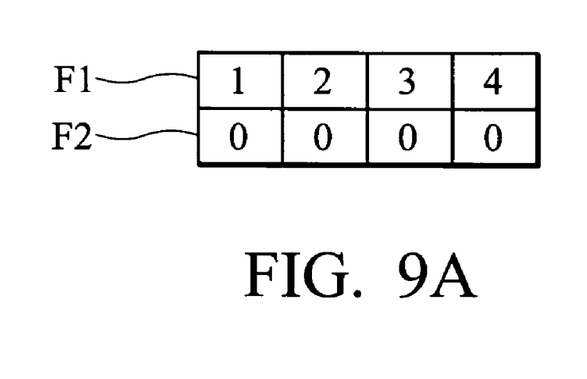
FIGS. 9A-9D are examples of a GBL counting array.
Figure 9B:
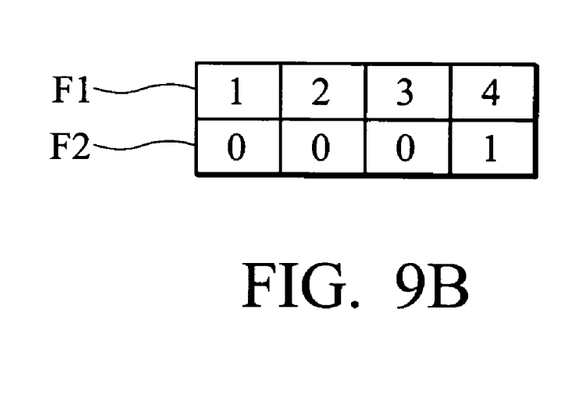
Figure 9C:
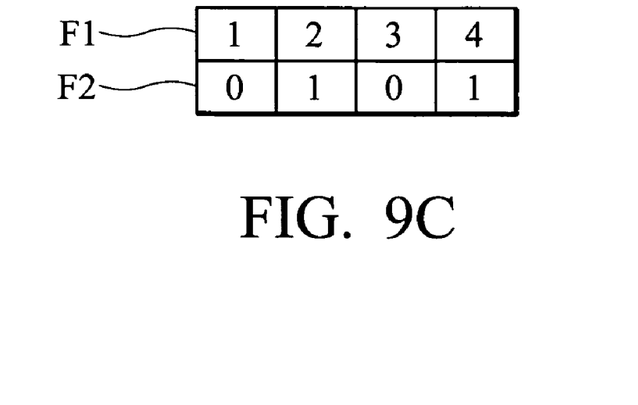
Figure 9D:
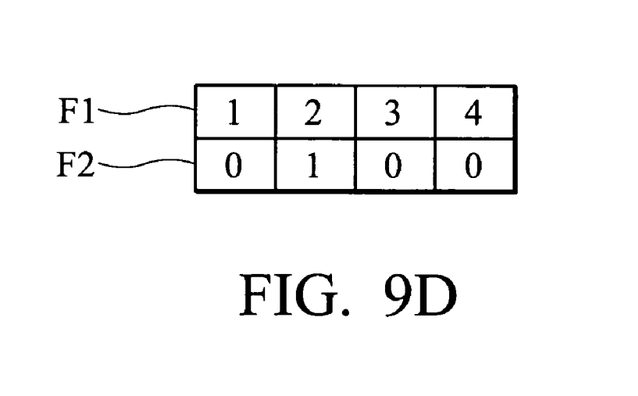

An example follows. An initial GBL counting array is shown in FIG. 9A. First, a critical application A activates GBL class "4". The counting array corresponding to GBL class "4" increments, as shown in FIG. 9B. Currently, the value "4" is selected as the system GBL class since it is the first non-zero GBL class. Then, another critical application B activates GBL class "2", resulting in nested GBL, as shown in FIG. 9C. The system down-searches the GBL counting array, and selects "4" as the system GBL class, because it is the current highest GBL class. After the completion of the critical application A, the selection of the GBL class "4" is removed. That is, the counting array corresponding to GBL class "4" decrements, as shown in FIG. 9D. Since the GBL class "2" becomes the only the non-zero counting value in the GBL counting array, the system GBL class is updated as 2.

Figure 10:
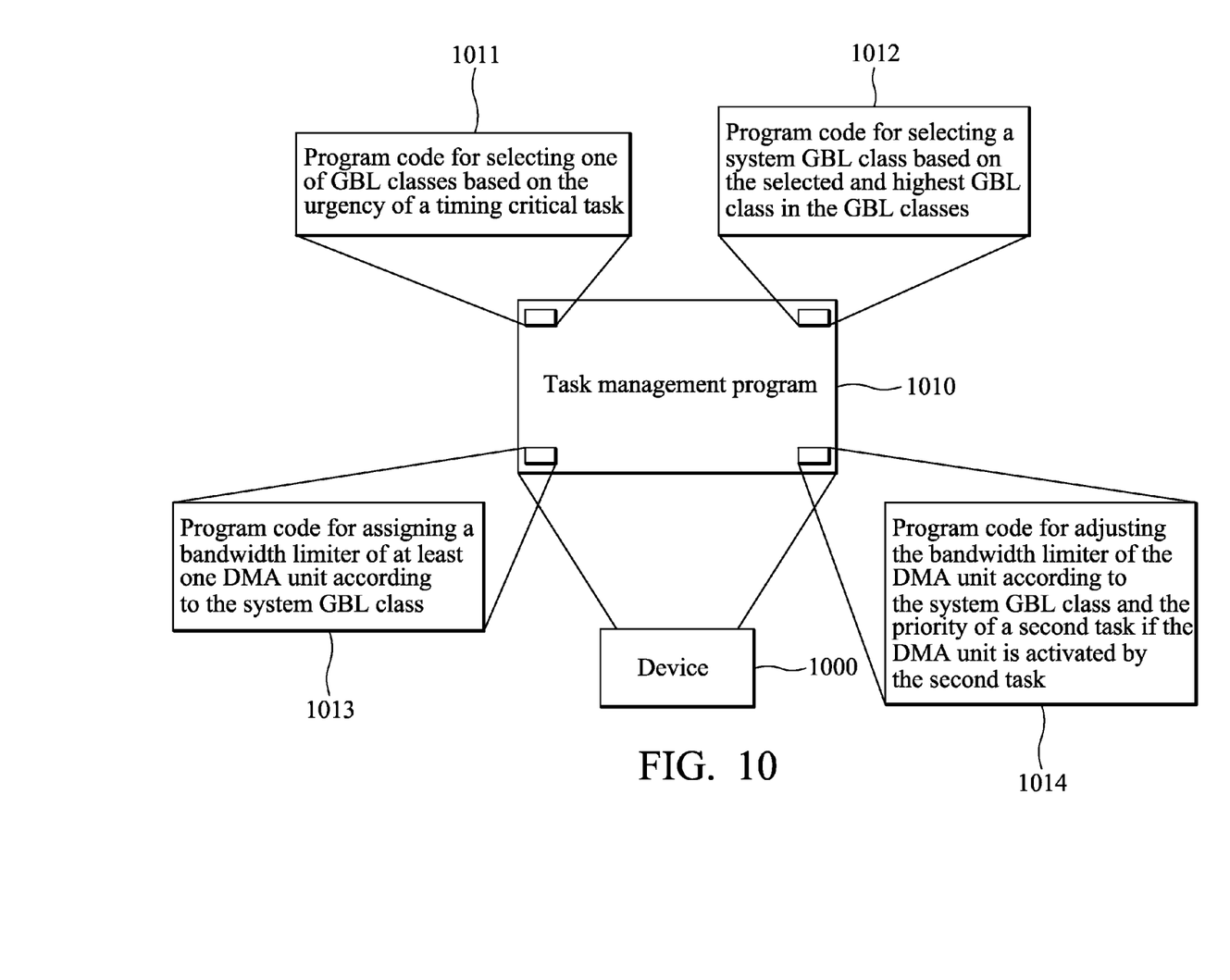
FIG. 10 is a schematic diagram illustrating an embodiment of a storage medium storing a computer program for execution of a task management method.

FIG. 10 is a schematic diagram illustrating an embodiment of a storage medium storing a computer program for execution of a task management method. The computer program product comprises a storage medium 1010 storing computer readable program codes for use in a device 1000. The computer readable program codes comprises at least computer readable program codes 1011 selecting one of GBL classes based on the priority of a first task, wherein the first task is from a MCU bus, computer readable program codes 1012 selecting a system GBL class based on the highest GBL class which has been selected among the GBL classes, computer readable program codes 1013 assigning a bandwidth limiter of at least one DMA unit according to the system GBL class, and computer readable program codes 1014 adjusting the bandwidth limiter of the DMA unit according to the system GBL class and the priority of a second task if the DMA unit is activated by the second task, wherein the second task is from a DMA bus, and the cycle between the DMA and MCU buses is determined according to the bandwidth limiter.

Task management methods, or certain aspects or portions thereof, may take the form of program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A task management method for managing tasks respectively from a first device and a second device, wherein the second device has a bandwidth limiter, comprising:
   providing a plurality of GBL (global bandwidth limiter) classes;
   selecting one of the GBL classes based on priority of a first task from the first device;
   recording the selected GBL class in a register, wherein the register is a GBL counting array, wherein the GBL counting array comprises a plurality of entries respectively corresponding to one of the GBL classes for recording times of the GBL class has been selected;
   determining a system GBL class based on the selected GBL class; and
   setting the bandwidth limiter of the second device according to the system GBL class to adjust an executing cycle of the second device.

2. The method of claim 1, further comprising:
   activating the first task of the first device; and
   determining whether the first task is complete.

3. The method of claim 2, further comprising:
   providing a second task from the second device; and
   resetting the bandwidth limiter of the second device according to the priority of the second task if the first task is not complete.

4. The method of claim 2 further comprising:
   removing the selection of the system GBL class and the GBL class corresponding to the first task if the first task is complete; and
   removing the setting of the bandwidth limiter of the second device accordingly.

5. The method of claim 1, wherein each GBL class contains a value for adjusting the executing cycle, wherein the greater the value is, the longer the executing cycle is adjusted.

6. The method of claim 1, wherein the system GBL class is selected from the recorded GBL class corresponding to a value having the longest executing cycle.

7. The method of claim 1, wherein the GBL classes include a GBL class 0, a GBL class 1, a GBL class 2, a GBL class 3 and a GBL class 4, the register is an array with four integer entries respectively corresponding to the GBL class 1, the GBL class 2, the GBL class 3 and the GBL class 4.

8. The method of claim 1 further comprising:
   providing a third task from the first device;
   selecting one of the GBL classes based on the priority of the third task, wherein the selected GBL classes according to the first and third tasks are different; and
   selecting the system GBL class as the selected GBL class corresponding to the third task if the selected GBL class corresponding to the third task is higher than that of the first task.

9. The method of claim 8 further comprising selecting the system GBL class as the selected GBL class corresponding to the third task if the selected GBL class corresponding to the third task is lower than that of the first task, and the first task is complete.

10. The method of claim 1, wherein the first device is a MCU (micro-controller unit).

11. The method of claim 1, wherein the second device is a DMA (direct memory access) unit.

12. A task management method, comprising:
   providing a plurality of GBL (global bandwidth limiter) classes;
   selecting one of the GBL classes based on priority of a first task, wherein the first task is from a MCU (micro-controller unit);
   recording the selected GBL class in a register wherein the register is a GBL counting array, wherein the GBL counting array comprises a plurality of entries respectively corresponding to one of the GBL classes for recording the times of the GBL class has been selected;
   selecting the highest GBL class among the recorded GBL classes as a system GBL class; and
   setting a bandwidth limiter of a DMA (direct memory access) unit according to the system GBL class, wherein an executing cycle between the DMA unit and MCU is determined according to the bandwidth limiter.

13. The method of claim 12 further comprising: activating the first task; and determining whether the first task is complete.

14. The method of claim 13, further comprising: providing a second task from the DMA unit; and
resetting the bandwidth limiter of the DMA unit according to the priority of the second task if the first task is not complete.

15. The method of claim 13 further comprising:
removing the selection of the system GBL class and the recorded GBL class corresponding to the first task if the first task is complete; and
removing the setting of the bandwidth limiter of the DMA unit accordingly.

16. The method of claim 12, wherein the GBL classes include a GBL class 0, a GBL class 1, a GBL class 2, a GBL class 3 and a GBL class 4, the register is an array with four integer entries respectively corresponding to the GBL class 1, the GBL class 2, the GBL class 3 and the GBL class 4.

17. A task management method for use in a system comprising a MCU (micro-controller unit) and at least one DMA (direct memory access) unit, the at least one DMA unit having a bandwidth limiter for determining an executing cycle between the at least one DMA unit and MCU, comprising:
providing a first task from the MCU;
selecting a system GBL (global bandwidth limiter) class according to priority of the first task;
recording the selected system GBL class in a register, wherein the register is a GBL counting array, wherein the GBL counting array comprises a plurality of entries respectively corresponding to one of a plurality of system GBL classes for recording times of the system GBL class has been selected; and
setting the bandwidth limiter of the at least one DMA unit according to the system GBL class to adjust the executing cycle.

18. The method of claim 17 further comprising adjusting the bandwidth limiter of the DMA unit activating a second task according to the priority of the second task.

19. The method of claim 17, wherein the system is an embedded system.

20. The method of claim 17, wherein the system is a mobile phone.

21. A task management method for use in a system comprising a MCU (micro-controller unit) and at least one DMA (direct memory access) unit, the at least one DMA unit having a bandwidth limiter for determining an executing cycle between the at least one DMA unit and MCU, comprising:
providing a first task from the MCU;
selecting a system GBL (global bandwidth limiter) class according to priority of the first task;
recording the selected system GBL class in a register, wherein the register is a GBL counting array, wherein the GBL counting array comprises a plurality of entries respectively corresponding to one of a plurality of system GBL classes for recording times of the system GBL class has been selected;
setting the bandwidth limiter of the at least one DMA unit according to the system GBL class to adjust the executing cycle;
providing a second task from the at least one DMA unit; and
resetting the bandwidth limiter of the at least one DMA unit activating the second task according to priority of the second task.

22. The method of claim 21, wherein the system is an embedded system.

23. The method of claim 21, wherein the system is a mobile phone.

24. A task management system, comprising:
a first device providing a first task;
a second device having a bandwidth limiter; and
a control device, coupled to the first device and the second device, wherein the control device provides a plurality of GBL classes, selects one of the GBL classes based on priority of the first task, records the selected GBL class in a register, wherein the register is a GBL counting array, wherein the GBL counting array comprises a plurality of entries respectively corresponding to one of the GBL classes for recording times of the GBL class has been selected, selects a system GBL class based on the selected GBL class, and sets the bandwidth limiter according to the system GBL class to adjust an executing cycle of the second device.

25. The system of claim 24, wherein the first device further activates the first task, and the control device further determines whether the first task is complete.

26. The system of claim 25, wherein the second device further provides a second task, and the control device further resets the bandwidth limiter of the second device according to the priority of the second task if the first task is not complete.

27. The system of claim 24, wherein the first device is a MCU.

28. The system of claim 24, wherein the second device is a DMA unit.

29. The system of claim 24, wherein the control device comprises an EMI arbitrator.

30. A task management system, comprising:
a MCU (micro-controller unit) providing a first task;
a register, wherein the register is a GBL counting array, wherein the GBL counting array comprises a plurality of entries respectively corresponding to one of the GBL classes for recording times of the GBL class has been selected;
a DMA (direct memory access) unit having a bandwidth limiter; and
a control device, coupled to the MCU and the DMA unit, wherein the control device provides a plurality of GBL (global bandwidth limiter) classes, selects one of the GBL classes based on priority of the first task, records the selected GBL class in the register, selects the highest GBL class among the recorded GBL classes as a system GBL (global bandwidth limiter) class, sets the bandwidth limiter of the DMA unit according to the system GBL class, wherein an executing cycle between the DMA unit and the MCU is determined according to the bandwidth limiter.

31. The system of claim 30, wherein the MCU further activates the first task, and the control device further determines whether the first task is complete.

32. The system of claim 31, wherein the DMA unit further provides a second task, and the control unit further resets the bandwidth limiter of the DMA unit according to the priority of the second task if the first task is not complete.

33. The system of claim 30, wherein the control device comprises an EMI arbitrator.

34. A device, comprising:
a MCU (micro-controller unit) configured to provide a plurality of GBL (global bandwidth limiter) classes, select one of the GBL classes based on priority of a first task from the MCU, and determine a system GBL class based on the selected GBL class;
a register, wherein the register is a GBL counting array, wherein the GBL counting array comprises a plurality of entries respectively corresponding to one of the GBL classes for recording times of the GBL class has been selected; and a DMA (direct memory access) unit configured to set a bandwidth limiter of the DMA unit according to the system GBL class to adjust an executing cycle of the DMA unit.

35. A device, comprising:
a MCU (micro-controller unit) configured to provide a plurality of GBL (global bandwidth limiter) classes, select one of the GBL classes based on priority of a first task, wherein the first task is from the MCU (micro-controller unit), record the selected GBL class in a register, wherein the register is a GBL counting array, wherein the GBL counting array comprises a plurality of entries respectively corresponding to one of the GBL classes for recording times of the GBL class has been selected, and select a highest GBL class among the recorded GBL classes as a system GBL class; and
a DMA (direct memory access) unit configured to set a bandwidth limiter of the DMA (direct memory access) unit according to the system GBL class, wherein an executing cycle between the DMA unit and MCU is determined according to the bandwidth limiter.

36. A device, comprising:
a MCU (micro-controller unit) configured to provide a first task from a MCU, select a system GBL (global bandwidth limiter) class according to priority of the first task, and record the selected system GBL in a register, wherein the register is a GBL counting array, wherein the GBL counting array comprises a plurality of entries respectively corresponding to one of a plurality of system GBL classes for recording times of the system GBL class has been selected; and
a DMA (direct memory access) unit configured to set a bandwidth limiter of the DMA unit according to the system GBL class to adjust an executing cycle.

37. A device, comprising:
a MCU (micro-controller unit) configured to provide a first task, select a system GBL (global bandwidth limiter) class according to priority of the first task, and record the selected system GBL in a register, wherein the register is a GBL counting array, wherein the GBL counting array comprises a plurality of entries respectively corresponding to one of a plurality of system GBL classes for recording times of the system GBL class has been selected; and
a DMA (direct memory access) unit configured to set a bandwidth limiter according to the system GBL class to adjust the executing cycle, provide a second task, and reset the bandwidth limiter of the DMA unit activating the second task according to priority of the second task.

38. A machine-readable storage medium comprising a computer program, which, when executed, causes a device to perform a task management method, the method comprising:
providing a plurality of GBL (global bandwidth limiter) classes;
selecting one of the GBL classes based on priority of a first task from a first device;
determining a system GBL class based on the selected GBL class; and
setting a bandwidth limiter of a second device according to the system GBL class to adjust an executing cycle of the second device.

39. A machine-readable storage medium comprising a computer program, which, when executed, causes a device to perform a task management method, the method comprising:
providing a plurality of GBL (global bandwidth limiter) classes;
selecting one of the GBL classes based on priority of a first task, wherein the first task is from a MCU (micro-controller unit);
recording the selected GBL class in a register, wherein the register is a GBL counting array, wherein the GBL counting array comprises a plurality of entries respectively corresponding to one of the GBL classes for recording times of the GBL class has been selected
selecting the highest GBL class among the recorded GBL classes as a system GBL class; and
setting a bandwidth limiter of a DMA (direct memory access) unit according to the system GBL class, wherein an executing cycle between the DMA unit and MCU is determined according to the bandwidth limiter.

40. A machine-readable storage medium comprising a computer program, which, when executed, causes a device to perform a task management method, the method comprising:
providing a first task from a MCU (micro-controller unit);
selecting a system GBL class according to priority of the first task;
recording the selected system GBL class in a register, wherein the register is a GBL counting array, wherein the GBL counting array comprises a plurality of entries respectively corresponding to one of a plurality of system GBL classes for recording times of the system GBL class has been selected; and
setting a bandwidth limiter of a DMA (direct memory access) unit according to the system GBL class to adjust an executing cycle.

41. A machine-readable storage medium comprising a computer program, which, when executed, causes a device to perform a task management method, the method comprising:
providing a first task from a MCU (micro-controller unit);
selecting a system GBL (global bandwidth limiter) class according to priority of the first task;
recording the selected system GBL class in a register, wherein the register is a GBL counting array, wherein the GBL counting array comprises a plurality of entries respectively corresponding to one of a plurality of system GBL classes for recording times of the system GBL class has been selected;
setting a bandwidth limiter according to the system GBL class to adjust the executing cycle;
providing a second task from a DMA (direct memory access) unit; and
resetting the bandwidth limiter of the DMA unit activating the second task according to the priority of the second task.

* * * * *